United States Patent Office 3,112,199
Patented Nov. 26, 1963

3,112,199
LAMINATES INCLUDING PHOTOGRAPHIC FILMS COMPRISING MODIFIED, SUPERFICIALLY ADHESIVE FILMS OF CRYSTALLINE POLYMERIC ALPHA-OLEFINS, AND METHODS FOR MAKING SUCH LAMINATES
Aldo Camerini and Luciano Lucchetti, Terni, Italy, assignors to Montecatini Società Generale per l'Industria Mineraria e Chimica, Milan, Italy
No Drawing. Filed Jan. 27, 1959, Ser. No. 789,260
Claims priority, application Italy Jan. 28, 1958
11 Claims. (Cl. 96—87)

This invention relates to films and laminates comprising crystalline polymeric alpha-olefins consisting prevailingly of isotactic macromolecules. More particularly, the invention relates to photographic films.

Natta et al. have disclosed high molecular weight, highly crystalline polymers of the alpha-olefins $CH_2=CHR$ where R is hydrocarbon, which polymers consist prevailingly of isotactic macromolecules, i.e., macromolecules having substantially no branches longer than R and, at least for very long sections of the main chain, or for substantially the main chain, the particular stereoregular structure which Natta has called "isotactic" (Jr. Amer. Chem. Soc., March 20, 1955) and which is characterized in that the tertiary asymmetric carbon atoms of successive monomeric units have the same steric configuration.

It has also been disclosed that films formed of those polymeric alpha-olefins of Natta et al., and especially films formed from the propylene and butene-1-polymers, and mixtures thereof, have outstanding physical and mechanical properties.

One of the problems that existed in using films of the crystalline isotactic polypropylene in laminates was to discover an adhesive which, by adhering firmly to the isotactic polypropylene film, or to both that film and films or layers of other materials (such as a photosensitive layer or a layer of photographic gelatine) would insure a permanent tight adhesion of the laminae. Such firm, permanent adhesion of the layers would permit the production of stable laminates consisting of two or more films of isotactic polypropylene, as well as the production of laminates consisting of layers or films of other materials anchored to a supporting layer or film of the isotactic polypropylene.

Natta et al. disclosed, also, other different propylene polymers which consist prevailingly of atactic macromolecules as defined by Natta, i.e., of linear, regular head-to-tail macromolecules having substantially no branches longer than R and in which tertiary asymmetric carbon atoms having the same steric configuration are randomly distributed along the chain. The polymers made up of the atactic macromolecules as defined are amorphous and adhesive, instead of being crystalline and plastic like the polymers made up of the isotactic macromolecules.

It was found that low molecular weight propylene polymers consisting prevailingly of the atactic macromolecules as defined are excellent adhesives for bonding films of the crystalline isotactic polypropylene to each other and to films or layers of other materials.

Thus, a pending application discloses photographic films comprising a support formed by a film of the isotactic crystalline polypropylene and to which the outer photosensitive layer is bonded by an intermediate layer of polypropylene consisting prevailingly of isotactic macromolecules.

Another pending application discloses flat and tubular laminates in which films of the crystalline, isotactic polypropylene are bonded to each other by means of the adhesive, amorphous polypropylene consisting prevailingly of the atactic macromolecules.

One object of the present invention is to provide new laminated structures comprising at least one film of crystalline, isotactic polypropylene.

Another object is to provide films of crystalline isotactic polypropylene which are superficially adhesive.

A still further object is to provide new photographic films in which the photosensitive layer is firmly adhered directly to a superficially modified and adhesive film of isotactic, crystalline polypropylene.

These and other objects are accomplished according to this invention by treating an oriented, stabilized film of the crystalline polypropylene with one or more sulfonating, chlorinating or chlorosulfonating agents, such as conc. sulfuric acid, oleum, phosphosulfonic acid, sulfuryl chloride, chlorosulfonic acid or the like, whereby reactive sulfonic, chloric and/or chlorosulfonic groups are introduced into the polypropylene at the surface of the film and render the surface adhesive.

The reactive groups can be introduced by passing the crystalline polypropylene film, at room temperature, through the agents specified or through a solution thereof in a solvent which has no solvating action on the polypropylene.

The solvent, when used, is preferably chloroform, dichloroethylene or trichloroethylene. The concentration of the sulfonating, chlorinating, or chlorosulfonating agent in the solvent can vary widely depending on the particular agent used.

In practice, while most of the chlorinating and/or sulfonating agents can be used in very dilute solutions, i.e. in solutions having a concentration not higher than 2% to 3% by weight, it is necessary to use certain of the agents in pure form. Depending on the chlorosulfonation method used, it is important, generally, to control the time of exposure of the crystalline, isotactic film in the chlorosulfonation bath so that the modification is restricted to substantially the surface of the film and modification of the polypropylene throughout the thickness of the film, which would detract from its inherently excellent mechanical properties, is avoided.

However, it is to be noted, also, that, under certain conditions the sulfonation time, with the same agent, can be prolonged beyond the normal limit without unfavorable effect on the mechanical properties of the crystalline, isotactic support.

The permissible variations in the time of exposure of the film to the modifying agent will be evident from the examples hereinbelow, in which the useful operating conditions for the common sulfonating agents are illustrated.

In general, the crystalline, isotactic polypropylene film is treated with the modifying agent for a time varying between 0.5 second and 15 minutes.

After the treatment with the sulfonating agent, the film is washed with suitably selected liquids to remove sulfonating agent adhering to it. When a solution of the sulfonating agent is used, the washing is preceded by removal of the solvent at moderate temperature, preferably by treating the film with a stream of warm air.

According to a further embodiment of the invention, the film of crystalline, isotactic polypropylene, after treatment with the chlorosulfonating agent, is treated with an amine either as such or in solution. The common organic amines may be used, such as, for instance, isobutylamine, tetramethylene pentamine, monoethanolamine, diethanolamine, ethylene diamine, etc. The amination of the sulfonated film further increases the adhesiveness of the surface of the film.

When the treatment with the amine is carried out on a film which has been treated with a solution of the chlorosulfonating agent, and the solvent used is soluble in the amination bath, the solvent adhering to the film after its withdrawal from the chorosulfonating bath is removed in the amination bath. Excess chlorosulfonating agent is always eliminated by washing.

The film removed from the amination bath (if amination is carried out) is washed and dried.

Films treated by the method described can be used as the support for photographic films, or in the preparation of flat and tubular laminates generally.

When the modified, superficially adhesive film of crystalline, isotactic polypropylene is used as the support in a movie or photographic film, the usual gelatine layer can be applied to the support by any of the known methods including immersion, spraying, dropping from a hopper provided with a scraper, etc., and maintains in dispersion the usual compositions suitable for black-and-white and color pictures.

The crystalline, isotactic polypropylene film which is modified in accordance with the invention and used, e.g., as the support in the new photographic films can be obtained by extruding a melt of the polymer through a film-forming device, and stretching the resulting film in one, or in both, directions.

The following examples are given to illustrate the invention, it being understood that these examples are not intended to be limiting. The examples are given in terms of a film of crystalline polypropylene consisting prevailingly of isotactic macromolecules, but films of other crystalline polymers of the alpha-olefins which consist prevailingly of isotactic macromolecules such as polymeric butene-1, as well as mixtures of such polymers, e.g., mixtures of polypropylene and polybutene-1 can be superficially modified in the same way, and used as supports for photographic films and in the preparation of flat or tubular laminates, generally.

EXAMPLE 1

A film of a crystalline polypropylene consisting prevailingly of isotactic macromolecules, having an intrinsic viscosity of 1.5 determined in tetralin at 135° C., obtained by extruding the molten mass through an extruder for thermoplastic materials and having a suitably regulated length and a thickness of 130 microns, is passed at room temperature through a bath consisting of a solution of 2 parts by weight of chlorosulfonic acid and 98 parts by weight of anhydrous trichloroethylene, with an immersion time of 0.5 second.

The wet film, after leaving the bath, is kept for 15 seconds at 25° C. and the solvent is evaporated under a warm air stream.

The film is then passed through a solution of 3 parts of a photographic gelatine in 97 parts water at 40° C. (permanence time 0.5 second) and is then dried under a warm air stream.

The gelatine layer thus formed on the film surface cannot be easily removed by abrasion and is not stripped off if the film is broken.

The tests for mechanical strength have demonstrated that the mechanical properties of the crystalline polypropylene support remained practically unaltered.

EXAMPLE 2

A film of a crystalline polypropylene such as that of Example 1, obtained by extruding the molten polymer through an extruder for thermoplastic materials and having a suitably regulated length and a thickness of 130 microns, is passed at room temperature through a bath consisting of a solution of 2 parts of chlorosulfonic acid in 98 parts anhydrous trichloroethylene, so that the immersion time amounts to 0.5 second.

The wet film, after leaving the bath, is kept at 20° C. for 2 seconds and is then passed through a second bath consisting of 2 parts isobutylamine in 98 parts dioxane at such a rate that its surface remains in contact with the solution for 0.5 second. The film is then washed with water and dried.

A gelatinous emulsion of silver salts is coated onto the support. In this case, also the tests for adhesion and strength have demonstrated that there is a perfect adhesion between the support and the photosensitive layer.

EXAMPLE 3

A crystalline polypropylene film such as that of the preceding examples, obtained by extruding the molten polymer through an extruder for thermoplastic materials and having a thickness of 130 microns, is passed at room temperature through a bath of sulfuryl chloride in which it remains for about 3 minutes.

The excess $SO_2Cl_2$ is removed by washing the film with petroleum ether, acetone and water. The film is kept at 20° C. for 5 seconds and is then passed through a bath consisting of a 2% solution of isobutylamine in anhydrous dioxane; it remains immersed in this bath for 0.5 second.

After conditioning at 20° C. for 5 seconds the film is washed with water and then dried.

A good adherence of the gelatine emulsion of Ag halide (prepared either for use as a black-and-white negative or as a base for a color negative) to the support prepared as described, is obtained.

EXAMPLE 4

A crystalline polypropylene film such as that of the preceding examples, obtained by extruding the molten mass through an extruder for thermoplastic materials and having a thickness of 130 microns, is immersed at room temperature in an oleum bath ($SO_3=20\%$) where it remains for 5 minutes.

It is then extracted from the bath, washed with nitromethane and immersed in an ethylene-diamine bath for 5 minutes at 50° C. After withdrawal from the bath, the film is washed with water and dried. A solution of 5 parts gelatine in 95 parts water is spread on this polypropylene support. The two layers are not separated by abrasion or after cutting or breaking the polypropylene film. A layer consisting of a gelatinous emulsion of an Ag halide is spread on the same film; the photographic film thus prepared remains perfectly intact during the normal processes of development and fixing. Adhesion between the emulsion and the support is maintained.

The mechanical properties of the final film are practically identical with those of an untreated film of the crystalline polypropylene.

EXAMPLE 5

A crystalline polypropylene film having an intrinsic viscosity of 1.5 and a thickness of 70 microns, obtained by extruding the molten mass through an extruder for thermoplastic material, is subjected to a chlorosulfonation treatment similar to that described in Example 1.

The sulfochlorinated film is laminated together with another similarly sulfochlorinated film of crystalline polypropylene having an intrinsic viscosity of 1.5 and a thickness of 70 microns, sulfochlorinated as the preceding one, after both films are coated with an adhesive composition consisting of an acetone solution of an epoxy resin derived from epichlorhydrin and bis-phenol. The lamination is carried out by passing the two overlapping films between two rollers heated at 130° C.

The laminate thus obtained is suitable for use in the packing industry.

EXAMPLE 6

A film obtained from crystalline polypropylene having an intrinsic viscosity of 1.5 and a thickness of 50 microns, subjected to a sulfochlorination treatment similar to that described in Example 2, is coupled with a polyethylene terephthalate film having a thickness of 80 microns, operating as in the preceding example. The adhesive used comprises a low molecular weight polyamide resin. The temperature of the coupling rollers is about 130° C.

A laminated film is obtained which can be heat-sealed, and can be used in the packing industry due to its very good impermeability to gases and water vapor.

EXAMPLE 7

Using a sulfochlorinated polypropylene film similar to that used in the preceding example, a laminate is prepared by coupling the superficially modified polypropylene film with a film of vinylchloride-vinylacetate copolymer having a thickness of 90 microns, and using an adhesive comprising a mixture of polyvinyl acetate and polyethyleneimine.

The laminated film thus obtained is a very good material suited for various types of packing, such as the manufacture of packing bags, and for a number of other applications.

As noted above, modification of the surface of the polypropylene film in accordance with this invention makes possible a wide extension in the character and type of extraneous adhesive compositions which can be used in preparing laminates comprising the polypropylene films. Binding compositions other than the adhesives based on the amorphous atactic polypropylenes may be used successfully, as shown by this and preceding examples.

In fact, it has been established by a series of tests carried out on films of crystalline propylene polymerizates consisting prevailingly of isotactic polypropylene that various compositions which exhibit no adhesive power when applied to normal, unmodified polypropylene films, do exhibit remarkable adhesiveness when applied to the polypropylene films modified in accordance with this invention.

The results of the tests are shown in Table I below in which are shown the specific components of the adhesive compositions tested, the solvent used in applying the adhesive, and the adhesiveness found, expressed as kg./cm. and determined on both unmodified normal films and the superficially chlorosulfonated films of the invention, respectively.

ene diamine, ethylenimine etc., as such or in solution with solvents for the amines (esters, diethylacetate, water, alcohols such as methyl-, ethyl-, isopropyl-alcohols etc.) or with solvents for the amines which are also solvents for the solvents for the sulfonating agents (dioxane, $CCl_4$ etc.).

The foregoing examples and Table I amply demonstrate the effectiveness of the introduction of the modifying groups into the polypropylene at the surface of the films in rendering the surface adhesive so that it can be bonded directly to another similar film or to films or layers of dissimilar materials, or by means of an intermediate layer of adhesive compositions in general. In practice, various changes and modifications can be made in the details given, without departing from the spirit of the invention and, therefore, we intend to include in the scope of the appended claims all such changes and modifications as may be apparent to those skilled in the art from the description and examples given herein.

What is claimed is:

1. A method for rendering a film of highly crystalline polypropylene consisting prevailingly of isotactic macromolecules superficially adhesive, which method comprises treating the surface of said film with a 2 to 3% solution of a modifying agent selected from the group consisting of sulfuric acid and chlorosulfonic acid in a solvent selected from the group consisting of chloroform, dichloroethylene and trichloroethylene for about 0.5 second to 5.0 minutes to introduce sulfonic groups into the polypropylene substantially exclusively at the surface of the film, removing the solvent from the film by means of warm air, and washing the film to remove any acid adhering to it.

2. The method according to claim 1 characterized in that the modifying agent is chlorosulfonic acid.

3. The method according to claim 1, characterized in that the film treated with the solution of acid, is washed to remove any unreacted acid, adhering to it, and then reacted with an organic amine, washed, and dried.

4. The method according to claim 3, characterized in that the organic amine is ethylene diamine.

5. The method according to claim 3, characterized

*Table I*

[Comparison of the adhesiveness of two unstretched, normal unmodified polypropylene films assembled together with the adhesive compositions shown disposed between them, with the adhesiveness of two unstretched polypropylene films sulfonated in accordance with the invention and adhered together by means of the same adhesive compositions.]

| Solvent | Components of the adhesive | | | | | | Adhesiveness in kg./cm. | |
|---|---|---|---|---|---|---|---|---|
| | 1° | Parts | 2° | Parts | 3° | Parts | Untreated films | Sulfonated films |
| Acetone | phenol-formaldehyde resin | 30 | polyvinyl acetate (Vinavil K50) | 30 | | | 0 | 0.430 |
| Do | do | 20 | polyvinyl acetate | 20 | dibutyl phthalate | 10 | 0 | 0.150 |
| Toluene | polyamide Bekalite 50 | 20 | do | 20 | | | 0.050 | 0.320 |
| Do | polyamide | 20 | do | 20 | dibutyl phthalate | 10 | 0.100 | 0.640 |
| Chloroform | 15% polyamide | | | | | | 0 | 0.100 |
| Acetone | | | polyvinyl acetate | 30 | dibutyl phthalate | 15 | 0 | 0.250 |
| Ethanol | | | polyvinyl butyrate | 20 | do | 10 | 0 | 0.200 |
| Methyl ethyl ketone | Vinylite VMGH [1] | 10 | Hycar rubber [2] | 10 | dioctyl phthalate | 4 | 0 | 0.250 |

[1] Vinyl VMGH=vinylchloride—vinyl acetate—maleic anhydride copolymer.
[2] Hycar Rubber=acrylonitrile—butadiene copolymer.

Methods for obtaining the films formed of the poly-(alpha-olefins) consisting prevailingly of isotactic polymer have been disclosed. The films can be stretched or not, in the course of their production, or after their production, and if (as is generally preferred) the films are stretched, the stretching can be carried out in one or both of the main orthogonal directions. Laminates can be produced by coupling at least two stretched films together in such manner that the contiguous films are stretched in opposite directions.

In the process according to the invention a number of amines can be used, such as isobutylamine, tetramethylene pentamine, monoethanolamine, diethanolamine, ethyl-that the organic amine is a solution of isobutylamine in dioxane.

6. The method according to claim 1, characterized in that the film is treated with the solution of acid, and then, without prior removal of the solvent, is treated with an organic amine in a solvent in which the chlorinated solvent used in the treatment with the acid, is also soluble, whereby the said chlorinated solvent is removed from the film during the amination of the sulfonated polypropylene.

7. As a new article of manufacture, a laminate consisting of at least two strata bonded to each other, at least one of the strata being a film of highly crystalline polypropylene consisting prevailingly of isotactic macromolecules and which has been rendered superficially adhesive by treating the surface of the film with a 2% to 3% solution of a modifying agent selected from the group consisting of sulfuric acid and chlorosulfonic acid in a solvent selected from the group consisting of chloroform, dichloroethylene and trichloroethylene for a time of from about 0.5 second to about 5.0 minutes, to thereby introduce sulfonic groups into the polypropylene substantially exclusively at the surface of the film, the polypropylene film being disposed in the laminate with the surface thereof comprising the polypropylene substituted by the sulfonic groups, contiguous to the next adjacent stratum of the laminate.

8. As a new article of manufacture, a laminate consisting of at least two strata bonded to each other, at least one of the strata being a film of highly crystalline polypropylene consisting prevailingly of isotactic macromolecules and which has been rendered superficially adhesive by treating the surface of the film with a 2% to 3% solution of a modifying agent selected from the group consisting of sulfuric acid and chlorosulfonic acid in a solvent selected from the group consisting of chloroform, dichloroethylene and trichloroethylene for a time of from about 0.5 second to about 5.0 minutes, to thereby introduce sulfonic groups into the polypropylene substantially exclusively at the surface of the film, and thereafter reacting the film with an organic amine, the polypropylene film being disposed in the laminate with the surface thereof comprising the polypropylene substituted by the sulfonic groups, and amino groups, contiguous to the next adjacent stratum of the laminate.

9. A photographic film comprising at least one gelatin-silver halide layer and, as a support therefor, a film of highly crystalline polypropylene consisting prevailingly of isotactic macromolecules, and which has been rendered superficially adhesive by treating a surface thereof with a 2% to 3% solution of a modifying agent selected from the group consisting of sulfuric and chlorosulfonic acid in a solvent selected from the group consisting of chloroform, dichloroethylene and trichloroethylene, for from about 0.5 second to 5 minutes, to thereby introduce sulfonic groups into the polypropylene substantially exclusively at the surface of the film, the polypropylene film being disposed in the photographic film with its surface comprising the sulfonic groups contiguous to the gelatin-silver halide layer.

10. A photographic film comprising at least one gelatin-silver halide layer and, as a support therefor, a film of highly crystalline polypropylene consisting prevailingly of isotactic macromolecules, and which has been rendered superficially adhesive by treating a surface thereof with a 2% to 3% solution of a modifying agent selected from the group consisting of sulfuric and chlorosulfonic acid in a solvent selected from the group consisting of chloroform, dichloroethylene and trichloroethylene, for from about 0.5 second to 5 minutes, to thereby introduce sulfonic groups into the polypropylene substantially exclusively at the surface of the film, and then reacting said surface with an organic amine, the polypropylene film being disposed in the photographic film with its surface comprising the sulfonic groups and amino groups contiguous to the gelatin-silver halide layer.

11. As a new article of manufacture, a laminate comprising at least two strata, at least two of the contiguous strata being stretched films of highly crystalline polypropylene consisting prevailingly of isotactic macromolecules, one of said contiguous films being stretched in one direction and the other of said films being stretched in the opposite direction, at least one of said contiguous films being superficially adhesive as a result of treating a surface thereof with a 2% to 3% solution of a modifying agent selected from the group consisting of sulfuric acid and chlorosulfonic acid in a solvent selected from the group consisting of chloroform, dichloroethylene and trichloroethylene for from about 0.5 second to about 5 minutes to thereby introduce sulfonic groups into the polypropylene substantially exclusively at the surface of the film, the superficially adhesive surface comprising the polypropylene substituted by the sulfonic groups being disposed away from the outer surface of the laminate.

References Cited in the file of this patent

UNITED STATES PATENTS

| Re. 24,062 | Horton | Sept. 20, 1955 |
| 2,639,998 | Pavlic | May 26, 1953 |
| 2,786,783 | Hahn et al. | Mar. 26, 1957 |
| 2,805,173 | Ambler | Sept. 3, 1957 |
| 2,832,698 | Walles | Apr. 29, 1958 |
| 2,849,431 | Baxter | Aug. 26, 1958 |
| 2,879,177 | Nelson | Mar. 24, 1959 |